United States Patent [19]
Thoms et al.

[11] Patent Number: 5,927,129
[45] Date of Patent: Jul. 27, 1999

[54] APPARATUS AND PROCESS FOR MAKING CUT EXTRUDED HOLLOW PROFILES

[75] Inventors: Volker Thoms, Calw; Andreas Poellmann, Herrenberg; Klaus Mueller; Udo Bahrke, both of Berlin, all of Germany

[73] Assignee: Daimler-Benz Aktiengesellschaft, Stuttgart, Germany

[21] Appl. No.: 09/064,764

[22] Filed: Apr. 23, 1998

[30] Foreign Application Priority Data

Apr. 23, 1997 [DE] Germany .............................. 197 17 066

[51] Int. Cl.⁶ ........................................................ B21C 25/02
[52] U.S. Cl. ............................ 72/268; 72/254; 219/121.67; 264/150; 83/53
[58] Field of Search ........................... 72/46, 55, 253.1, 72/254, 264, 268; 219/121.67, 121.68, 121.69, 121.72, 121.82, 121.85; 264/148, 149, 150, 209.1, 209.6, 477; 83/53, 177, 941; 82/47, 102; 425/142, 308, 527

[56] References Cited

U.S. PATENT DOCUMENTS

| | | |
|---|---|---|
| 4,776,998 | 10/1988 | Davidson et al. ........................ 264/148 |
| 5,035,100 | 7/1991 | Sachs ........................................ 264/148 |
| 5,151,246 | 9/1992 | Baumeister et al. ........................... 419/2 |
| 5,484,981 | 1/1996 | Nakazawa et al. ................. 219/121.72 |
| 5,611,568 | 3/1997 | Masuda .................................... 280/784 |
| 5,665,284 | 9/1997 | Erwin et al. ............................. 264/150 |

FOREIGN PATENT DOCUMENTS

| | | | |
|---|---|---|---|
| AS1154264 | 9/1963 | Germany . | |
| 1959464 | 6/1971 | Germany . | |
| 254543 | 3/1988 | Germany ........................... 219/121.72 |
| 59-1115 | 1/1984 | Japan ....................................... 72/254 |
| 5-200431 | 8/1993 | Japan ....................................... 72/254 |

*Primary Examiner*—Joseph J. Hail, III
*Assistant Examiner*—Ed Tolan
*Attorney, Agent, or Firm*—Evenson, McKeown, Edwards & Lenahan, P.L.L.C.

[57] ABSTRACT

A process and an extrusion arrangement are suggested for cutting extruded hollow profiles while heated from the extruding process heat into the required lengths by means of a high-energy beam or jet moved along with the extruding operation. The interior of the extruded hollow profile is filled with a light-weight material at least at the cutting points. The light-weight material is advantageously an expansive foam mass, such as an aluminum foam or a plastic foam. The filling of the extruded hollow profile takes place either by coextrusion or by way of an arbor or a hollow-chamber bottom die of the extrusion arrangement.

14 Claims, 1 Drawing Sheet

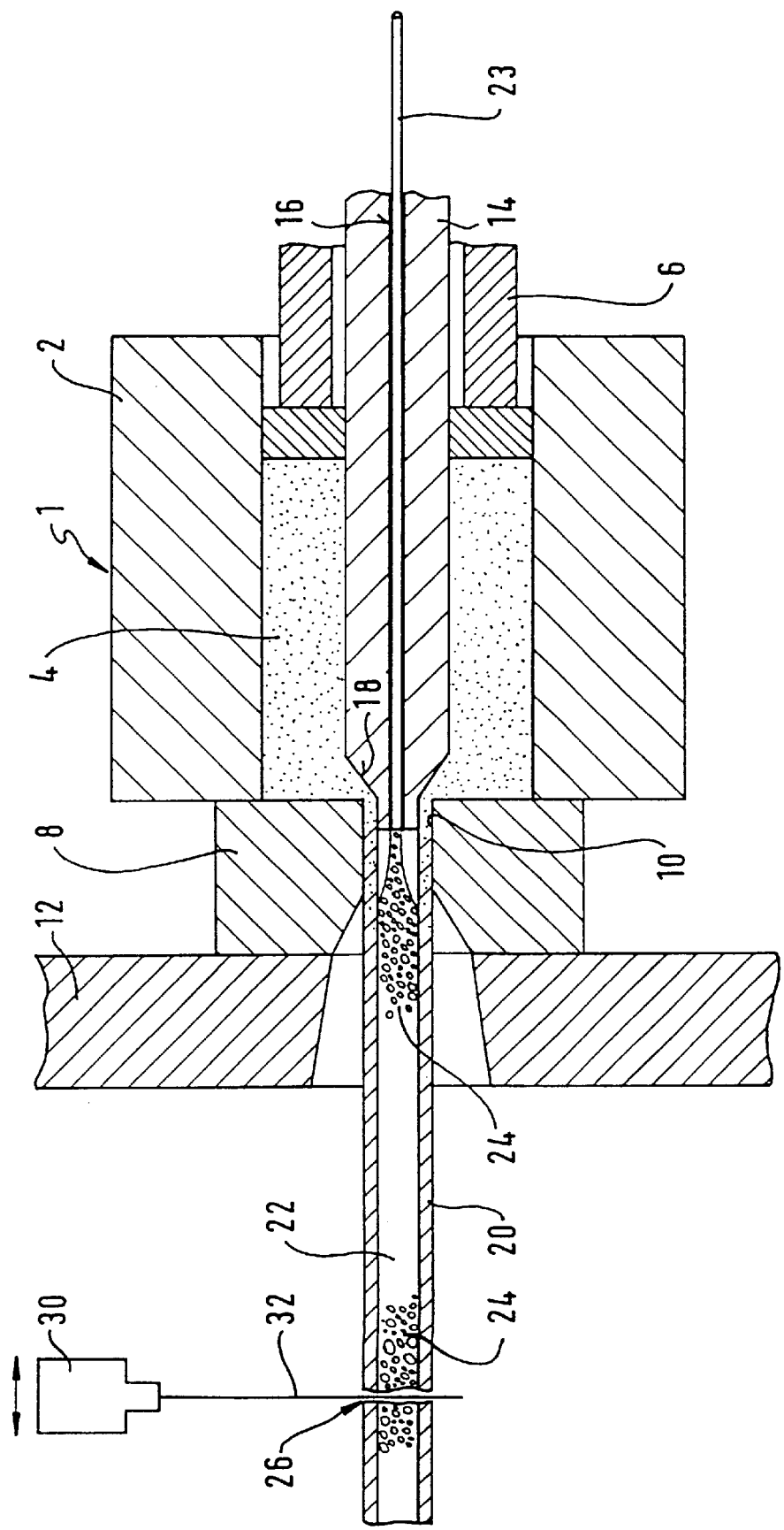

APPARATUS AND PROCESS FOR MAKING CUT EXTRUDED HOLLOW PROFILES

BACKGROUND AND SUMMARY OF THE INVENTION

This application claims the priority of German application 197 17 066.8-16, filed in Germany on Apr. 23, 1997, the disclosure of which is expressly incorporated by reference herein.

The present invention relates to an apparatus and a process for making extruded hollow profiles.

Hollow-chamber profiles made of metal are produced by means of extruding using an arbor or special hollow-chamber bottom dies (such as chamber, bridge or spider bottom dies) or welding chamber bottom dies for manufacturing the hollow profile. Struts situated within the hollow profile for stiffening the hollow-chamber profile with respect to torsional strain can be also be pressed along in the extruding operation. Furthermore, volume-filling reinforcements of the hollow-chamber profile to be optionally provided are implemented by fillers to be slid into the hollow profile or corner connectors to be welded into it. In the case of a manufacturing as cut pieces, the hollow-chamber profiles must be cut to the required length by means of a suitable cutting process. This takes place, for example, by means of so-called beam or jet processes, such as laser beam cutting or water jet cutting. In this case, after the cutting-through of the profile side facing the beam or jet, a widening and atomizing of the beam or jet takes place when it enters the interior of the profile. This widening has the result that the remaining energy density of the beam or jet will no longer be sufficient for cutting through another profile wall.

From German Patent Documents DE-AS 1 154 264 and DE-OS 1 959464, processes and arrangements are known for the continuous extruding of continuous profiles having a jacket made of a thermoplastic material and having a core made of a foamed material, the extruding of the thermoplastic material to form a hollow-chamber profile and its filling with the foamed material taking place by means of suitable, particularly concentrically arranged nozzles, in one manufacturing operation. For improving the stability characteristics, an extruded profile produced in this manner is filled throughout with foamed material. From German Patent Document DE-OS 1 959 464, it is known in particular to charge the foamable reaction mixture for forming the foamed-material core into the hollow profile first at a point at which the temperature of the jacket has fallen to a predetermined value.

Based on the above, it is an object of the invention to suggest a process for cutting extruded hollow profiles as well as an extrusion arrangement in the case of which a widening of the beam or jet used for cutting the extruded hollow profile to the required lengths does not take place or at least takes place only to such an extent that the cutting-through of profile walls which follow is not impaired.

For achieving this object, a process is suggested for cutting extruded hollow profiles by means of a high-energy beam or jet moved along with the extruding operation, wherein the interior of the extruded hollow profile is filled with a light-weight material at least at the cutting point or points. According to advantageous further developments of the process of the invention, this light-weight material is an expansive foam mass, such as an aluminum foam or a plastic foam. By placing such a light-weight material as the core material inside the profile at points at which cutting is to take place, the separability of the extruded hollow profile during the cutting to required lengths and the cutting to size of the profile by means of the above-mentioned beam or jet processes is improved since, during the beam or jet cutting, because of the formation of a beam-guiding or jet-guiding wall with the core material, an atomization or widening of the cutting beam or jet is avoided. As the light-weight material for filling the extruded hollow profile, particularly an expansive foam mass is suitable which can be charged into the hollow profile by way of a relatively small nozzle diameter and expands there to the desired dimension. However, the use of non-foaming filler materials is also possible for achieving the effect according to the invention.

In a further development of the invention, the filling of the extruded hollow profile takes place by means of coextrusion so that no separate operation is required for filling the extruded hollow profile.

In a further development of the invention, the filling of the extruded hollow profile takes place by way of an arbor or a welding-chamber bottom die of the extrusion arrangement used for manufacturing the extruded hollow profiles.

For further achieving the object of the invention, an extrusion arrangement is suggested which facilitates the process referred to above. According to the invention, the manufacturing of the extruded hollow profile is therefore permitted by the extruding known per se of a material situated in the extrusion chamber through a bottom die arranged at the head-side end of the extrusion chamber; by the filling of the extruded hollow profile at least at the desired cutting points with a light-weight material; as well as by cutting the extruded hollow profile into the required lengths by means of a high-energy beam or jet moved along with the extruding operation, while still warmed by the extruding process heat and in one operation.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a lateral longitudinally sectional view of an extrusion arrangement according to the invention.

DETAILED DESCRIPTION OF THE DRAWINGS

The drawing FIGURE shows a longitudinal section of an extruding arrangement 1 according to the invention for manufacturing hollow-profile workpieces made of metal, having an extrusion chamber 2, which comprises a hollow space for receiving material 4, and having an extrusion die 6 which is guided in the extrusion chamber 2 and compresses the material 4 by a longitudinal movement (in the illustration of FIG. 1, to the left).

At the head-side end of the extrusion chamber 2 situated in the extruding direction of the extrusion die 6, a bottom die 8, which closes off the hollow space of the extrusion chamber 2 and has an outlet opening 10, is arranged adjoining a stationary crosshead 12. In the hollow space of the extrusion chamber 2, an arbor 14 is provided which is arranged essentially concentrically with respect to the outlet opening 10 of the bottom die 8 and which has a conical tapering 18 at its end situated in the extruding direction, which tapering 18 extends into the outlet opening 10 of the bottom die 8. Furthermore, the arbor 14 has a continuous bore 16 which extends in the longitudinal direction of the arbor 14 and has a mouth at the conically tapered end.

For manufacturing an extruded profile, the metal material situated in the extrusion chamber 2 is compressed by the extrusion die 6 and is pressed around the arbor 14 through the outlet opening 10 of the bottom die 8, whereby an extruded hollow profile 20 is created whose cross-section depends on the shape of the outlet opening 10.

According to the invention, immediately following the extruding operation, a light-weight material is fed through the bore 16 of the arbor 14 into the interior 22 of the extruded hollow profile 20. In certain preferred embodiments, the light-weight material is an expansive foamed mass which, after emerging from the bore of the arbor 14, expands into the interior 22 of the extruded hollow profile 20 and fills in a cross-sectional a manner the hollow space of the extruded profile 20.

Advantageously, the light-weight material 24 is fed as a half-finished product 23, for example, in the form of a rod or a wire, through the bore 16 of the arbor 14. During the exiting from the mouth of the bore 16, a thermally and/or mechanically influenced reaction takes place which causes an expansion of the light-weight material 24. Depending on the selected material, this may be a pressed light-weight material, for example, in the form of a tandem pressing.

The filling of the extruded hollow profile 20 takes place at least at those points at which the extruded hollow profile 20 is cut into the required lengths and separated by means of a high-energy beam or jet moved along with the extruding operation. However, the extruded hollow profile 20 can also be filled with the light-weight material 24 along its whole length according to certain preferred embodiments of the invention.

For cutting the extruded hollow profile 20 while still warm from the extruding process heat into the required lengths, a device 30 for cutting the extruded hollow profile into lengths is provided which is arranged behind the bottom die 8 and which moves along in the direction of the indicated double arrow with the extruding operation so that the high-energy beam or jet 32 emitted by the device 30 impinges stationarily on the cutting point 26 of the extruded hollow profile 20.

For controlling the filling and expansion operation with the light-weight material 24, a device (not shown) is advantageously provided in the bottom die 8 for influencing the temperature and for controlling the reaction of the expansion zone of the light-weight material 24, which device is arranged behind the mouth of the bore 16 into the interior 22 of the extruded hollow profile 20.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for cutting extruded hollow profiles still warmed from the extruding process heat into required lengths by means of a high-energy beam or jet moved along with the extruding operation, wherein the interior of the extruded hollow profile is filled at least at the cutting point or points with a light-weight material.

2. Process according to claim 1, wherein the filling of the extruded hollow profile takes place by coextrusion.

3. Process according to claim 1, wherein the filling of the extruded hollow profile takes place by way of an arbor or a welding-chamber bottom die of the extrusion arrangement.

4. Process according to claim 1, wherein the light-weight material is an expansive foamed mass.

5. Process according to claim 3, wherein the light-weight material is an expansive foamed mass.

6. Process according to claim 4, wherein the light-weight material is an aluminum foam.

7. Process according to claim 4, wherein the light-weight material is a plastic foam.

8. Extrusion arrangement comprising:

an extrusion die which is guided in an extrusion chamber and which compresses material situated in the extrusion chamber and, for forming an extruded hollow profile, presses it through a bottom die arranged on a head-side end of the extrusion chamber, a device which is arranged behind the bottom die operable to cut the extruded hollow profile into required lengths by means of a high-energy beam or jet moved along in the extruding operation, and a light-weight material supplying device for adding a light-weight material into the interior of the extruded hollow profile at least at the designated cutting point or points during the extruding operation.

9. Extrusion arrangement according to claim 8, wherein the light-weight material supplying device is operable to fill the extruded hollow profile by way of a bore of an arbor connected with the interior of the extruded hollow profile.

10. Extrusion arrangement according to claim 8, wherein the bottom die is a hollow-chamber bottom die, and wherein the light-weight material supplying device is operable to fill the extruded hollow profile by way of a bore of the hollow-chamber bottom die connected with the interior of the extruded hollow profile.

11. Extrusion arrangement according to claim 8, wherein the light-weight material is an expansive foam mass.

12. Extrusion arrangement according to claim 11, wherein the light-weight material is an aluminum foam.

13. Extrusion arrangement according to claim 11, wherein the light-weight material is a plastic foam.

14. Extrusion arrangement according to claim 8, wherein the light-weight material supplying device utilizes the heat of the extrusion process to heat the light-weight material as it fills the interior of the hollow profile.

* * * * *